April 29, 1958
R. S. COOMBS
2,832,430
SOUND MUFFLER DEVICE FOR EXHAUSTS
OF INTERNAL COMBUSTION ENGINES
Filed April 23, 1954
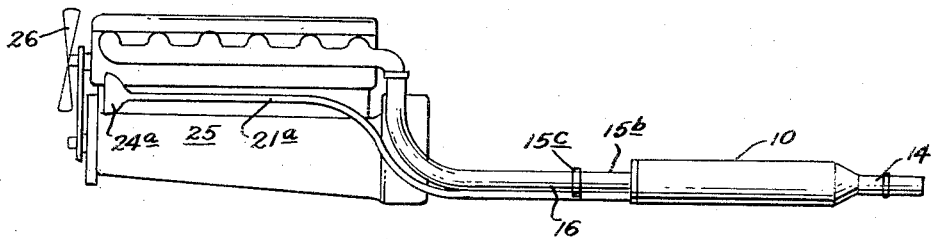
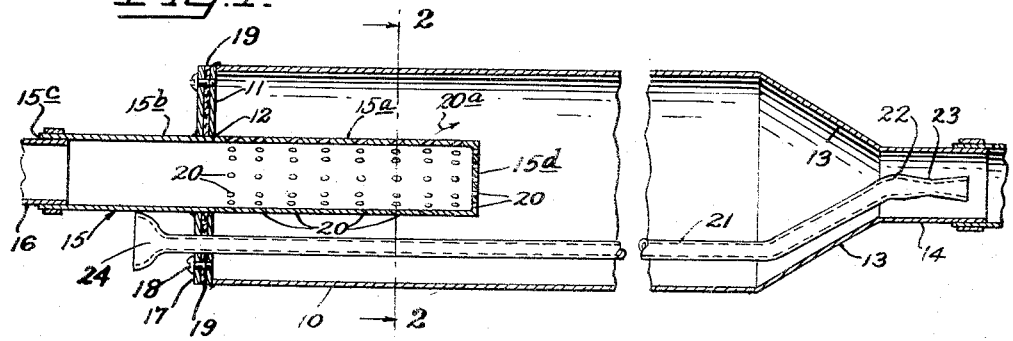
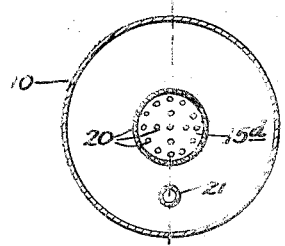
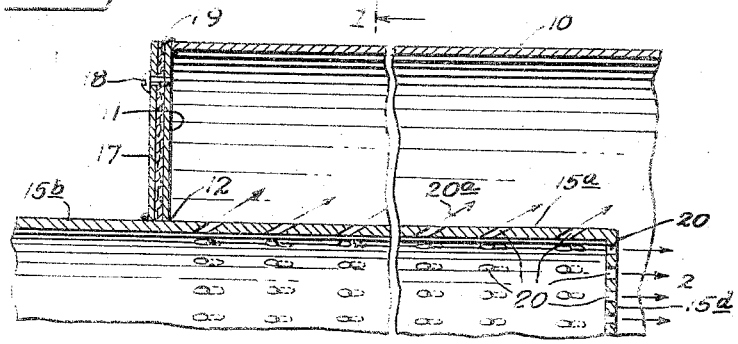
INVENTOR.
ROBERT S. COOMBS
BY
ATTORNEY

2,832,430

SOUND MUFFLER DEVICE FOR EXHAUSTS OF INTERNAL COMBUSTION ENGINES

Robert S. Coombs, San Francisco, Calif.

Application April 23, 1954, Serial No. 425,069

14 Claims. (Cl. 181—43)

This invention relates generally to mufflers for internal combustion engines and more particularly relates to such mufflers having means to reduce the sound of engine combustion and preferably aerate or dilute the exhaust gases and draw such gases through the muffler at an accelerated rate of transit.

Though the invention is primarily adapted for employment in motor-driven vehicles, such as automobiles and motorcycles, it will also find advantageous use with stationary internal combustion engines.

Broadly stated, the invention comprises a hollow elongated tubular muffler shell or casing having a closure wall at its end more adjacent to the engine and receiving within said end one end portion of a diffuser tube of relatively lesser diameter which in turn communicates at its opposite end with the manifold exhaust of the engine, the portion of the diffuser tube within the muffler having a plurality of perforations therethrough. The opposite tubular end portion of the muffler casing is flanged inwardly preferably at a frusto-conical incline to a throat to which is connected a tubular length of tail pipe which is the usual outlet for exhaust gases. To accelerate and dilute the flow of exhaust gases, an aerator pipe extends lengthwise through the muffler casing and has an intake opening for atmospheric air forwardly of the closure wall of the muffler casing; or it may be extended forwardly by means of an extended tube so that the intake opening of the aerator pipe may optionally be positioned adjacently to the engine fan to subject the tube to an intake of air forced by the fan. The aerator tube terminates within the tail pipe portion of the muffler adjacent to the frusto-conical throat whereby the outlet of atmospheric air flowing through the aerator tube and discharging into the tail pipe tube adjacent the muffler throat not only discharges a current of air to dilute the gases exhausted from the muffler but also provides a vacuum at said throat which increases the velocity of flow of gases from the muffler, rapidly clearing exhaust gases from the muffler and engine exhaust pipe and preventing congestion of gases, which it is believed measurably increases the facility of the combustion chambers of the engine to completely and more rapidly exhaust the gases and therefore operate more efficiently as a power unit.

The objects of the invention are to facilitate the exhaust of gases of combustion from an internal combustion engine and decrease the sound thereof and accelerate the flow of the gases through a muffler while aerating such gases as they are discharged into the atmosphere.

One form in which the invention may be exemplified is described herein and illustrated in the accompanying drawing in which:

Fig. 1 is a longitudinal central vertical sectional view of the invention on line 1—1 of Fig. 2.

Fig. 2 is a vertical transverse sectional view on line 2—2 of Fig. 1.

Fig. 3 is a fragmentary enlarged longitudinal sectional view of a portion of structure of Fig. 1.

Fig. 4 is a longitudinal side elevation of a modified form of the invention, in relation to an internal combustion engine and fan.

Referring to the drawing in which like reference characters indicate the corresponding parts in the several views, 10 is an elongated hollow muffler casing having its forward end more nearly adjacent to the engine closed by an end closure plate 11 which has a tight peripheral seal to the adjacent end of the circumferential wall of the casing, said end closure plate having a central opening 12 therein, the opposite end portion of the muffler casing being tapered inwardly providing a frusto-conical throat 13 which merges into a tubular tail pipe portion 14 to which may be connected the usual tail pipe which extends to the rear end of a vehicle for exhaust of gases of combustion beyond a vehicle body in a well known manner. At said forward end of the muffler casing an elongated axially aligned diffuser tube 15 extends through the opening 12 of the end plate 11, being coaxial with the casing throughout its length, one end portion of the length of said tube being thus enclosed within the muffler as at the inner portion 15a and the other or outer forward portion of its length 15b extending beyond the muffler and end closure plate 11 to provide a free end 15c which is adapted to be tightly connected to the exhaust tube 16 from the exhaust manifold of an internal combustion engine. The diffuser tube 15 is preferably of uniform diameter throughout its length and the outlet tail pipe tube 14 of the casing is preferably of substantially similar diameter.

The diffuser tube 15 is held in the opening 12 by a radial flanged collar plate 17 which is tightly secured upon the diffuser tube intermediate the ends thereof as by welding, the flange collar plate being relatively bolted as at 18 for tight connection to the end plate 11 with a suitable thermal insulation packing gasket 19 therebetween, such as a packing ring of asbestos. Thus by removal of the bolts 18 the muffler casing and diffuser tube may be separated for replacement of either of them, since the inner portion 15a is of suitable diameter to slide through opening 12.

The end portion 15a of the diffuser tube 15 which is within the muffler casing is radially spaced inwardly and is short relative to the length of the casing. As exemplified in preferred form, its length is not to exceed one-half the length of the casing and its diameter is substantially one-third of the diameter of the casing as best shown in Fig. 1, the remainder of the muffler casing being free of obstruction for facilitating flow of the gases. The diffuser tube has an end wall 15d at its inner end, the circumferential portion of the side wall of the diffuser tube and the said end wall 15d which are within the muffler casing having a plurality of perforated orifices 20 therethrough, the orifices preferably being numerous and of an aggregate area of opening at least equal to and preferably substantially one and one-half times the lateral cross sectional area of the diffuser tube 15. In order to permit dispersion of sound vibrations immediately upon the gases entering the diffuser tube within the muffler, the orifices begin closely adjacent to the forward end at closure plate 11 of the casing.

The orifices 20 in the end plate may be aligned with the axis of the tube whereas the orifices in the side wall of the diffusion tube are preferably inclined from the interior to the exterior of the tube, the incline being in direction of the flow of gases through the muffler, as at 20a which manifestly is in the direction toward the tail pipe 14.

It is preferred to also provide means to aerate the gases of combustion prior to discharge thereof from the muffler, such means comprising an aerator pipe 21 of lesser diameter than the diffuser tube. This aerator pipe has its discharge end portion 22 opening into the tail pipe section 14 adjacently beyond the conical throat portion 13 of the muffler casing. At said discharge end the aerator pipe is provided with a Venturi terminal 23 to increase the velocity of the air passing therethrough, setting up a vacuum turbulance which draws the gases of combustion more rapidly through the muffler casing. The air intake or mouth of this aerator pipe may be at any suitable position forwardly of its discharge end whereby it would take in or scoop in atmospheric air by the forward movement of the vehicle. As exemplified herein, the aerator pipe has a bell or funnel mouth 24 forwardly of the end closure collars 11, 17 as shown in Fig. 1 and then extending rearwardly longitudinally through the muffler casing.

A modified form of intake for the aerator pipe is shown in Fig. 4 in which the pipe 21a is extended forwardly of the muffler parallel to the engine 25 and having its bell or funnel mouth 24a adjacently spaced rearwardly of the engine fan 26. This modification would have the advantage of providing a forced draft through the aerator pipe from the fan whenever the engine was running and would be effective even though the vehicle were not in motion, the efficiency being increased proportionate to the speed of the engine.

By dividing the sound of engine explosions into numerous channels by the orifices 20 of the diffusion tube, the sound of the explosions is greatly decreased, and sound-absorbing packing or filling may be eliminated in the muffler casing. The forced draft of atmospheric air of the Venturi 23 sets up a vacuum turbulence which draws the gases from the muffler more rapidly and also aerates the gases prior to discharge thereof, eliminating trapped gases in the muffler, increasing motor power by eliminating trapped gases in the muffler, increasing motor power by eliminating back pressure of gases and providing faster acceleration and fuel economy, the temperature of the muffler being also decreased by acceleration of flow of the gases through the muffler combined with the cooling effect of the aerator pipe passing through the gases in transit through the muffler.

Having described the invention, what is claimed as new and patentable is:

1. In a motor vehicle having an internal combustion engine and an exhaust manifold therefrom for discharge of gases of combustion, and a cooling fan forwardly of said engine, a muffler connected to the exhaust manifold, said muffler including a hollow elongated muffler casing body having at one end a closure plate having an opening therethrough, said muffler casing being tapered inwardly at its opposite end to a throat for connection to a tail pipe, a diffuser tube at said closed end of the muffler casing of smaller diameter than the muffler casing and having an end portion of its length extending into the casing through the opening in said closure plate and thereby closing said end of the casing, said diffuser tube having its opposite end portion open and adapted for communicating connection to the exhaust manifold of the engine, the portion of the diffuser tube within the muffler casing having a closure end plate and having orifices in its body wall of at least the area of the cross sectional area of the diffuser tube, an aerator pipe for taking in atmospheric air and having an inlet outside the muffler casing facing forwardly in direction of normal movement of a vehicle driven by the engine and having a discharge outlet within the muffler casing adjacent to the throat of the casing body.

2. An aerated muffler for internal combustion engines of vehicles having the elements of claim 1 and in which the side wall of the diffuser tube has orifices therein inclined outwardly and rearwardly towards the tapered end of the casing.

3. A muffler device of the character described having the elements of claim 1 and in which the aerator pipe is provided at its discharge outlet with a Venturi discharge end.

4. A muffler device for vehicular internal combustion engines having the elements of claim 1 and in which the inlet of the aerator pipe has an extension forwardly of the muffler casing of sufficient length to terminate adjacent to the rear of the fan of the internal combustion engine.

5. A muffler device for internal combustion engines comprising a hollow elongated muffler casing body having at one end a closure plate provided with an opening therethrough and having at the opposite end a discharge throat of smaller diameter than the muffler casing adapted for discharge of combustion gases, a diffuser tube removably mounted through said opening in said end closure plate, said tube having a forward end portion adapted for connection to the exhaust of an internal combustion engine and having an inner end portion extending into the casing through the opening in the end plate, means for removably mouting said diffuser tube in said endplate opening, the said inner end portion of the tube within the casing being less than half the length of the casing and having at its said inner terminal end a wall, said inner terminal end wall of the tube and the circumferential portion of the tube within the casing having a plurality of perforated orifices therethrough, and the inner perforated portion thereof being of a diameter whereby it may slide through the opening in said end plate.

6. A muffler device for internal combustion engines, as set forth in claim 5, and which includes an aerator tube having an inlet mouth outside the muffler casing facing forwardly in direction of the engine and having a discharge outlet within the muffler casing adjacent to the discharge throat of said casing.

7. A muffler device for internal combustion engines comprising a hollow elongated muffler casing body having at one end a closure plate provided with an opening therethrough and having at its opposite end a throat of smaller diameter than the casing body adapted for discharge of combustion gases, and a diffuser tube of lesser diameter than the opening in said end closure plate mounted removably through the opening of said plate, said diffuser tube being adapted at its forward outer end for communicating connection to the exhaust manifold of an internal combustion engine, the portion of the diffuser tube within the muffler casing having a plurality of orifices therein for discharge therethrough of gases of combustion discharged from an engine, and an aerator pipe longitudinally within the casing for taking in atmospheric air and having an inlet mouth outside the muffler casing facing forwardly in direction of the engine and having a discharge outlet within the muffler casing adjacent to the discharge throat of the muffler casing.

8. An aerated muffler for internal combustion engines having the elements of claim 7 and in which the said inner and outer portions of the diffuser tube are of uniform diameter and are coaxially aligned with the casing.

9. A muffler device of the character described having the elements of claim 7, the aerator pipe having a Venturi at its end adjacent the tapered discharge throat of the muffler casing.

10. An aerated muffler for internal combustion engines having the elements of claim 7 and in which the inlet of the aerator pipe has an extension forwardly of the muffler casing of sufficient length to terminate adjacent to the rear of the fan of an internal combustion engine.

11. A muffler device for internal combustion engines comprising a hollow elongated muffler casing body having at one end a closure plate provided with an opening therethrough, said muffler casing having at its opposite end a discharge throat of smaller diameter than the casing body adapted for discharge of combustion gases, a diffuser tube, means for removably mounting the diffuser tube through the opening in the said end closure plate at the closed end of the casing, said diffuser tube having an inner end portion of lesser diameter than the opening in said end closure plate extending into the casing through the opening in said end closure plate, said diffuser tube being adapted at its forward end for communicating connection to the exhaust manifold of an internal combustion engine, the portion of the diffuser tube within the casing being closed by a terminal end wall, said terminal end wall and the circumferential wall of the said portion within the casing having a plurality of orifices therein for discharge therethrough of gases of combustion discharged from the engine, the terminal end of the diffuser tube within the casing being free of obstruction to the flow of gases through said orifices in the said terminal end wall thereof.

12. A muffler device for internal combustion engines as set forth in claim 11, the means for removably mounting the diffuser tube in the end closure plate including a radially flanged plate mounted intermediate the ends of the tube, and means to removably connect said flange plate to the end closure plate of the muffler casing whereby the diffuser tube may be removably mounted in the opening of the end closure plate.

13. A muffler device for internal combustion engines as set forth in claim 11 and in which the inner and outer end portions of the diffuser tube are of uniform diameter and are in axial alignment relatively, the portion of the diffuser tube within the casing extending less than half the axial length of the casing.

14. A muffler device for internal combustion engines as set forth in claim 11, the diameter of the perforated inner end portion of the diffuser tube being less than the diameter of the opening in the end closure plate of the casing whereby said inner end of the diffuser tube may be slidably received through said opening of said end closure plate.

References Cited in the file of this patent

UNITED STATES PATENTS

| | | |
|---|---|---|
| 1,370,197 | De Bolotoff | Mar. 1, 1921 |
| 2,055,453 | Horton | Sept. 22, 1936 |
| 2,169,658 | Newton | Aug. 15, 1939 |
| 2,500,551 | Kliewer | Mar. 14, 1950 |
| 2,501,767 | Fluor et al. | Mar. 28, 1950 |

FOREIGN PATENTS

| | | |
|---|---|---|
| 221,302 | Great Britain | Sept. 11, 1924 |
| 730,694 | France | Aug. 19, 1932 |